United States Patent [19]

Weinert

[11] 4,435,355

[45] Mar. 6, 1984

[54] POWER WHEEL WITH DOUBLE ACTION VALVE IN CONJUNCTION WITH A DRILL BIT

[76] Inventor: Friederich Weinert, 219-19 131st Ave., Jamaica, N.Y. 11413

[21] Appl. No.: 405,310

[22] Filed: Aug. 4, 1982

Related U.S. Application Data

[63] Continuation-in-part of Ser. No. 182,104, Aug. 28, 1980, Pat. No. 4,340,970.

[51] Int. Cl.$^3$ ............................................... G21C 00/00
[52] U.S. Cl. .................................... 376/208; 376/912; 376/317
[58] Field of Search ............... 376/208, 910, 911, 912, 376/317

[56] References Cited

U.S. PATENT DOCUMENTS 4,340,970 7/1982 Weinert ............................... 376/208

Primary Examiner—Sal Cangialosi

[57] ABSTRACT

Power wheel with double action valves comprises a heat engine in form of a rotating vessel mounted to an axis supported at one end to a frame, or joined into a pipe or flexible hose as the other end is faced up by a side gear confronting a second side gear both gears intermeshing through a plurality of pinion gears mounted between first and second ends of both shafts, the pinion gears are activated through expansion valves concealing the shaft of the pinion gear, a plurality of expansion valves mounted on said outer perimeter on radial axis, each of said expansion valve including:

A cylinder with mechanical float valves
A piston with piston rods penetrating the cylinder
A valve control bar activated by stroke action of pistons
A helical mechanism to rotate spindle shaft by stroke action of pistons
A spindle shaft with two pawl bushings
A pinion gear joined to said spindle shaft
A drive gear for delivering useful work output mounted to the shaft of the vessel or a drill bit whereby the power wheel with double action valves is put at the top of the drill bit called platform to match both side gears to rotate the drill bit by blocking rotation of the power wheel by means of a plurality of chain saws installed inside the outer circumference of the power wheel whereby chain saw is extended to the outside of the outer circumference of the drill bit activated through spindle shaft penetrating expansion valves on one side as the other side of the shaft drives pinion gears to rotate the power wheel or drill bit, whereby stored fluid inside the vessel is heated to expand fluid whereby the volume exchange of the fluid activates piston inside the expansion valve by separating the pressurized fluid from the depressurized fluid, whereby the depressurized fluid is cooled inside a radiator to contract into relaxed stage, whereby a gear pump installed in center of the hollow shaft of the power wheel sucks up relaxed fluid out from the radiator to pump it back into the fluid reservoir of the vessel, as the pressurized side of the fluid activates pistons inside expansion valves to rotate pinion gears intermeshing between a stationary and mobile side gear to rotate the mobile side gear in order to do mechanical work.

13 Claims, 16 Drawing Figures

POWER WHEEL WITH DOUBLE ACTION VALVE IN CONJUNCTION WITH A DRILL BIT

BACKGROUND OF THE INVENTION

This invention is a continuation in part of a previous invention called "Power Wheel With Dependable Expansion Valves", No. 06/182, 104 filed Aug. 28, 1980 and Power Wheel U.S. Pat. No. 4,340,970

This invention introduces a fluid expansion power drive activated by a heat source. The machine is completely hermetically sealed and therefore can operate without any outside controls. Since no combustion is involved with the machine can replace any prime mover. Additionally, this machine can operate under almost any pressure deep in the ocean or in space. This machine is completely independent and therefore it introduces an entire new approach in ground drilling, meaning the embodiment of this invention includes a power wheel with double action valves to operate vehicles or generators and a power wheel with double action valves in conjunction with a drill bit for under water drilling. The difference between the two machines is that when the power wheel is installed in a vehicle the expansion valves are at the top in a horizontal position at the same time the fluid reservoir is at the bottom. By drill action the power wheel with double action valves is positioned upside down, meaning expansion valves are now at the bottom and the fluid reservoir is now located at the top, meaning the machine can operate in either position. The drill bit consists of a side gear which extends to the outside into a large radius like a wheel flange and the other side of the wheel is tapered and divided into a plurality of cutting edges. Channels penetrating the drill bit in the center and half way to the outer circumference of the drill bit, allow drill chips to penetrate through the drill bit whereby the drill chips get sucked up from the power wheel into a flexible hose. The connection of the power wheel with the drill bit is made by two side gears intermeshing with the pinion gears of the expansion valves and by inserting the hollow shaft of the power wheel into the center of the drill bit whereby surface contact is made through a thrust bearing and hollow lock screw keeping the shaft of the power wheel innerlocked with the drill bit. In this fashion either part meaning the power wheel or drill bit can rotate. To prevent this from occurring the power wheel has blades extending out of the circumference of the drill bit radius. The blades are surrounded with an active chain saw which is activated through the rotation of the spindle shaft inside each expansion valve. Therefore the entire drill unit can be lowered into the ground, the chain saw will cut into the ground and thereby prevents the power wheel from rotating so the full torque created inside the expansion valves is transmitted by pinion gears to the side gear of the drill bit and therefore rotates drill bit. The weight of the unit and the drill and saw action will lower the unit indefinitely, therefore a flexible hose is joined over the top end of the hollow power wheel shaft. In this regard the power wheel can be lowered into the ground and lifted out of the ground by a flexible hose. During drilling and saw action the ground becomes pulverized and therefore can be sucked up and pumped through the hose by means of injecting water and gases through jets in an upward direction into the hose. Therefore the machine can be lowered, raised and moved to any location by the hose. Ground drilling at the present stage is very expensive and time consuming, because till now no hole could be drilled without a drill shaft and extension. These parts are heavy and expensive, in order to handle these parts a tower has to be built. Additionally to rotate a small drill bit tons of steel have to be put into motion by a separate prime mover. This is a very costly and primitive approach. The present invention uses only one unit, a prime mover with a drill bit which lowers itself into the ground without any assistance from above except a flexible hose to direct pulverized sediments and water to the surface. The fuel to activate this machine is an internal heat source like microwaves, conventional or nuclear heat elements. I would like to underline that this invention when used deep on the ocean floor a nuclear heat source becomes necessary. To put this on record small fission reactors have been proven in the past to be the safest and reliable energy source. As example, patients with heart defects have used nuclear pacemakers without any ill effects or inconvenience. It is the big centralized nuclear power generation which have caused all the problems publicized worldwide. Nuclear power is the impulse of life, without the nuclei there would not be any organic matter, therefore the resistance against nuclear power is political nonsense promoted by the military regime, which have seduced and misused nuclear power and therefore should not be recognized as spokesman in the nuclear energy field. This invention introduces a nuclear heat source called "Self Oscillating Nuclear Reactor", also an Enternal Self Controlled Device. The deepest valleys in the oceanic surveys are filled with purified non-corroding metal dust mixed with sediments begging us to be harvested. All it takes is a vessel, a flexible hose several thousand feet in length and a power wheel in conjunction with the drill bit, a very moderate investment to explore and harvest the treasures of Mother Earth which are in abundance. I often wondered why the creator never commutes to the human race by letters or numbers. Our science community claims to interpret nature through mathematical formulas which do not exist in nature. All creation made by man are fakes as it can be well seen under a microscope. Every thing made by nature becomes more beautiful when the details are enlarged, and so this invention of mine being so close to nature is denied for the last five years because of the greediness and incompetence of a few government officials which encountered nature only once in a lifetime which was their moment of birth and hopefully they will encounter nature again because these few officials have hurt this nation beyond repair and should have no power of judgment. Further objects and advantages of the invention will be apparent from the following description of the invention.

SUMMARY OF THE INVENTION

POWER WHEEL WITH DOUBLE ACTION VALVES FOR OPERATION WITH A FLUID ABOVE THE CRITICAL POINT

The following statements are meant to describe the thermodynamic behavior of an engine whose power is derived from the expansion of a fluid upon the application of heat. The operating conditions are chosen so that the fluid is always above the critical point and the entire cycle of operation does not involve a change of phase in the working fluid. The particular engine to be described uses a set of spindles situated radially as spokes to drive a central shaft. Each spindle is caused to rotate by a piston which is powered by the heat expansion of a high pressure gas. Any steady heat source operating continuously at a comparatively low temperature may be utilized. At the end of the drive stroke the piston chamber is opened to a low pressure reservoir. The spindle shaft is double threaded and the pawl is then reversed so that the return stroke is also a power stroke. The effective thermodynamic cycle is $P_A = P_B \quad T_B = T_C$ $P_C = P_D \quad T_D = T_A$ $V_i = nRT_i/P_i$ The work per stroke is then $W = (P_A - P_D)(V_B - V_A)$. The heat required to cause the expansion is $Q = nC_p(T_B - T_A)$ where n is the number of moles in the cycle for each stroke; $n = (V_B - V_A)P_A/R(T_B - T_A)$. The efficiency $$e = W/Q = \frac{(P_A - P_D) R}{P_A C_P} = \left(1 - \frac{P_D}{P_A}\right) \frac{R}{C_P}.$$

For a working fluid He gas is chosen so as to minimize $C_P$ and hence maximize the efficiency. In the extreme case if $P_D$ could be made very small compared to $P_A$, then the efficiency for any such gas expansion cycle approaches $R/C_P$ as an upper bound. For a nonatomic ideal gas such as He the value of $R/C_P$ is 0.40. If a diatomic gas were used then $C_P$ would be larger and then a maximum possible efficiency of 0.29 would be the upper bound as $P_D$ approaches zero.

As a test medium high pressure helium gas has been chosen as the working fluid. For any normal operating conditions of a practical engine, all parts of the thermodynamic cycle will be above the critical point for helium. For the chosen operating conditions helium gas will not differ appreciably from the operation of an ideal gas. To verify this the terms of a van der Waal's equation are evaluated for a pressure of 60 Atm and a temperature of 800 K.

$(P - a/V^2)(V - b) = RT$

For He[1]: $a = 3.44 \times 10^{-3}$ (N/m²)m⁶/(g-mole)²; $b = 2.34 \times 10^{-5}$ m³/(g-mole).

1. Sears, Francis Weston, An Introduction to Thermodynamics, The Kinetic Theory of Gases, and Statistical Mechanics, p. 17, Addison-Wesley, New York, 1953.

At a pressure of 60 Atm. and a temperature of 800 K, 20 g-moles of helium occupy a volume of $2.18 \times 10^{-2}$ m³. The quantity $(a/V^2)/P$ then equals $4.8 \times 10^{-4}$ and $b/V = 2.2 \times 10^{-2}$. Consequently for helium gas under these conditions, the deviations from the ideal gas behavior are not more than several percent in the volume. The proposed engine has a central continuously operated heat source which heats and expands the working fluid. The expanding fluid is sequentially fed into a set of piston chambers.

The pistons driving each spindle are elliptical in outer cross section of the piston to prevent the piston from rotating ef a circular piston is chosen then Two Keys a 180° must be installed at the piston and matched with The Cylinder. As a possible engine size we shall consider a piston outer diameter of 16 cm and an inner diameter of 8 cm. The slot ways are 1 cm² in cross-section. For a 20 cm stroke the change in volume per stroke is then $V = 3.10 \times 10^3$ cm³ $= 3.10 \times 10^{-3}$ m³. The pressures $P_A$ and $P_B$ and the temperatures $T_A$ and $T_B$ can be chosen to give a desired operating pressure range and size of the low pressure reservoir. The number of moles of gas to be used is then fixed so as to give the desired V for the power stroke. In this case we choose $P_A = 60$ atm. and $P_D = 10$ atm. and $T_A = 373$ K and $T_B = 773$ K. For $P_A - P_D = 50$ atm. $= 50 \times 10^5$ N/m² the work per stroke is then $15.5 \times 10^3$ Joules. For a stroke per 0.20 seconds the power is then 77.5 kW. The maximum possible efficiency in this case is then $e = (1 - 1/6)(0.40) = 0.33$. The fact that the return stroke is also a power stroke would make possible for power to be delivered up to about 95% of the running time. The total power delivered to the central drive shaft for six radially placed spindles would then be approximately $6(0.95)77.5$ KW $= 442$ kW. This is equivalent to 590 horsepower. The total heat input required in this case is then at least 1396 kW.

DETAILED DESCRIPTION OF A PREFERRED EMBODIMENT

Figures 1, 2:
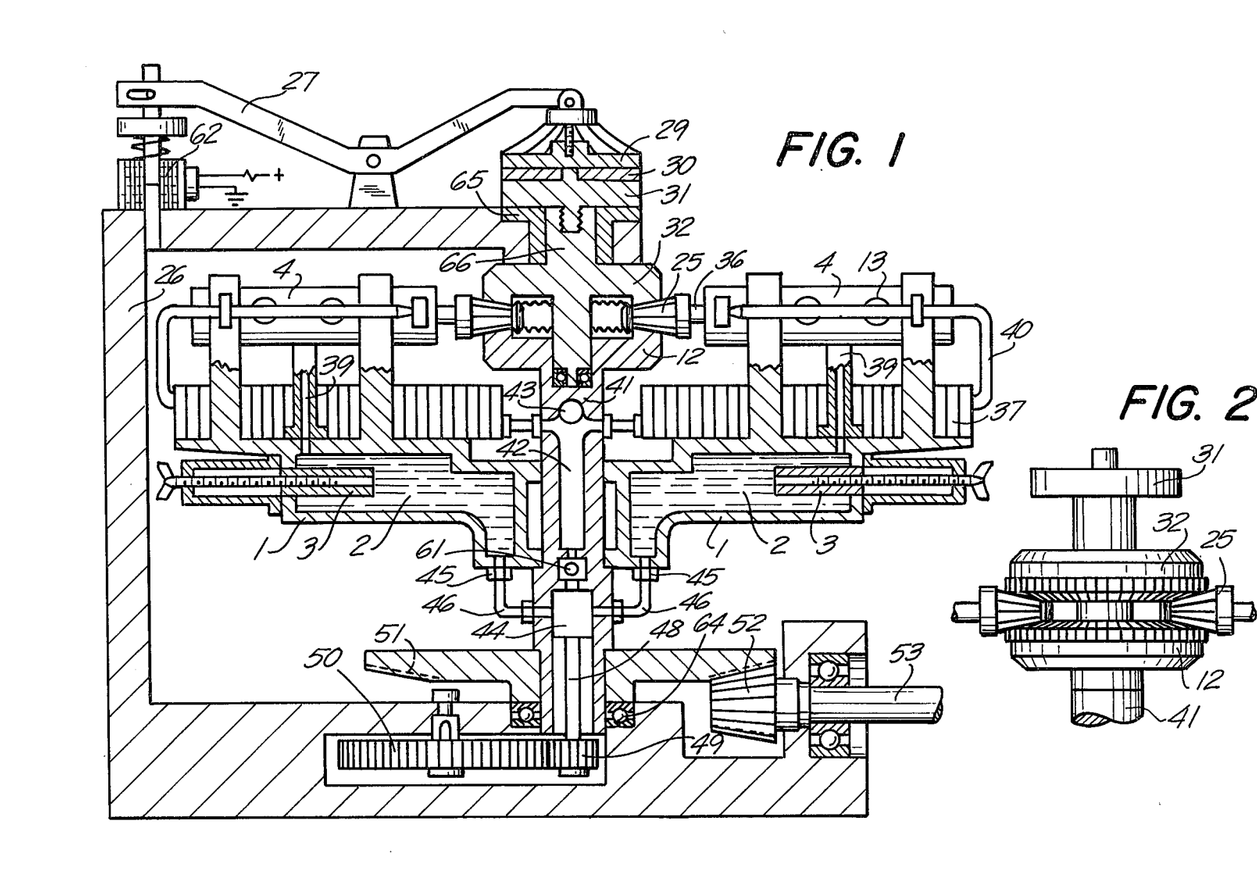
FIG. 1 is a partly sectional explanatory view of a power wheel with double action valves utilizing the volume exchange of a fluid through the apparatus of the invention.
FIG. 2 is a plain side view of two separate side gears intermeshing through pinion gears.
Figures 3, 5:
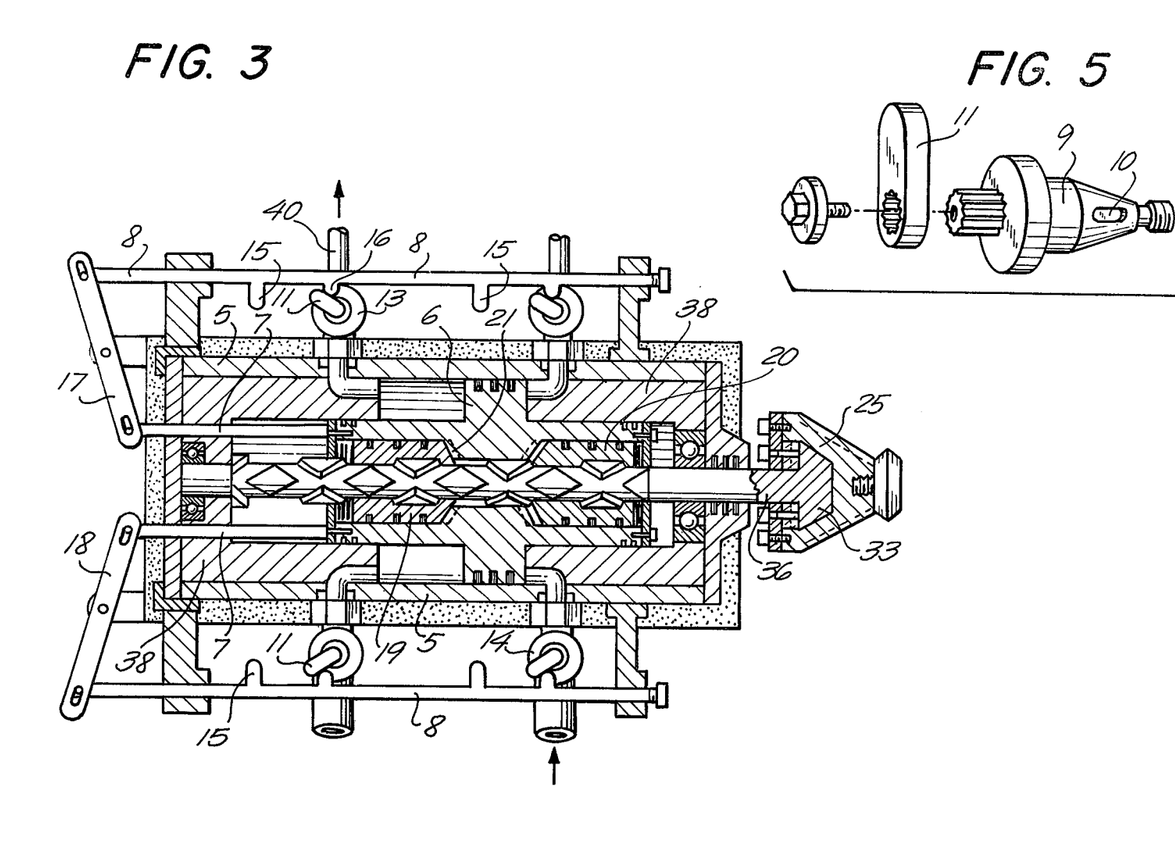
FIG. 3 is schematic vertical sectional view of the expansion valve in combination with a helical mechanism in a left stroke action.
FIG. 5 is a prospective view of valve piston and lever used for inlet and outlet valves as shown in FIGS. 3 and 4.
Figures 4, 6:
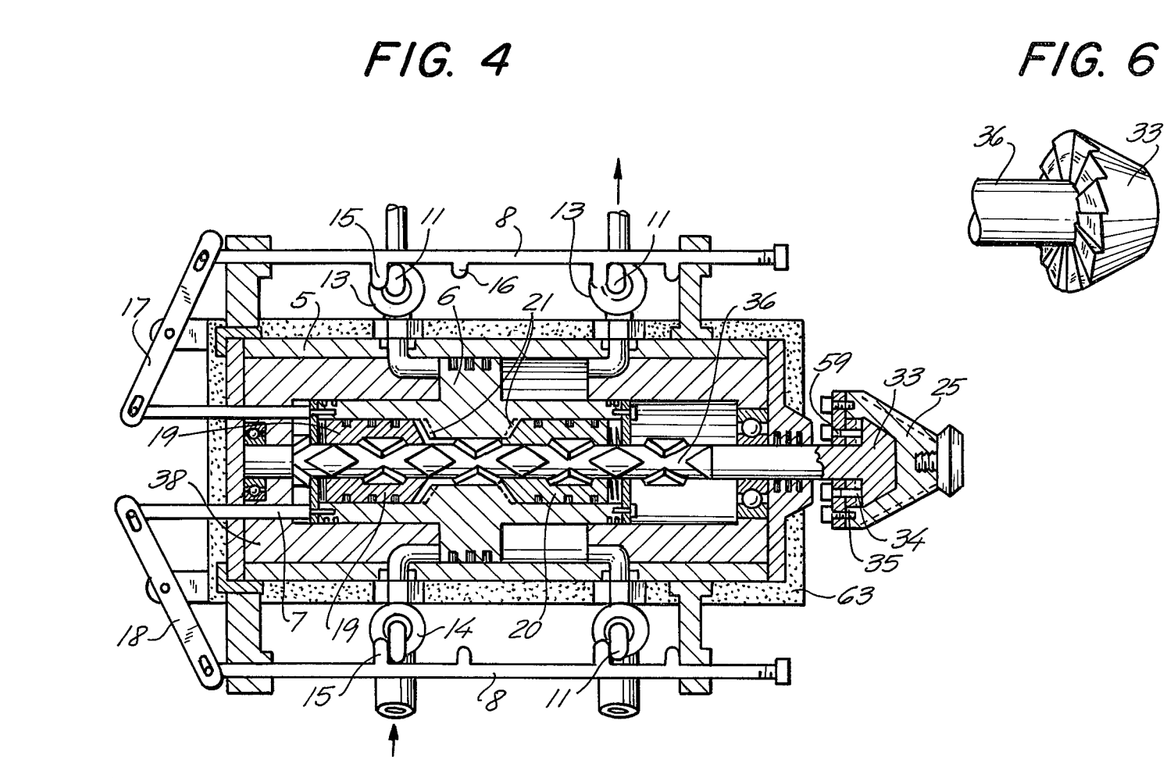
FIG. 4 is a schematic vertical sectional view of the expansion valve in a right stroke action.
FIG. 6 is a prospective view of the ratchet inside pinion gear as shown in FIGS. 3 and 4.
Figure 7:
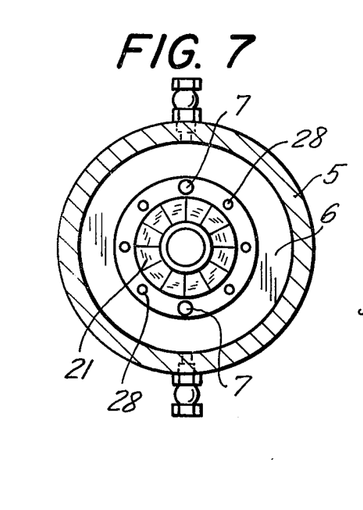
FIG. 7 is a schematic front sectional view of the pistons and cylinder from the expansion valve.
Figure 8:
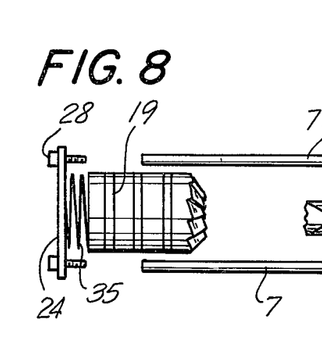
FIG. 8 is a plain side view of left pawl bushing.
Figure 9:
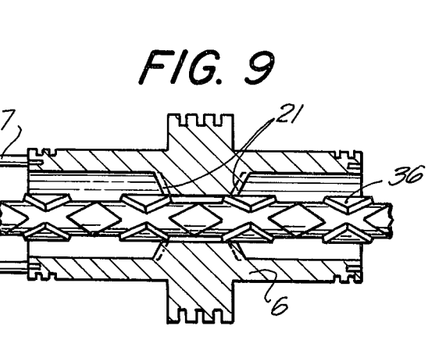
FIG. 9 is a schematic vertical sectional view of piston, push rod and spindle.
Figure 10:
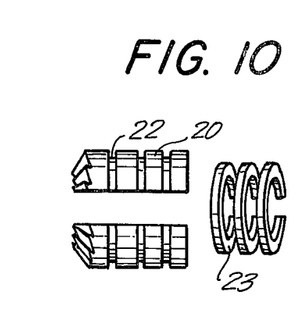
FIG. 10 is a plain side view of a right split pawl bushing.
Figure 11:
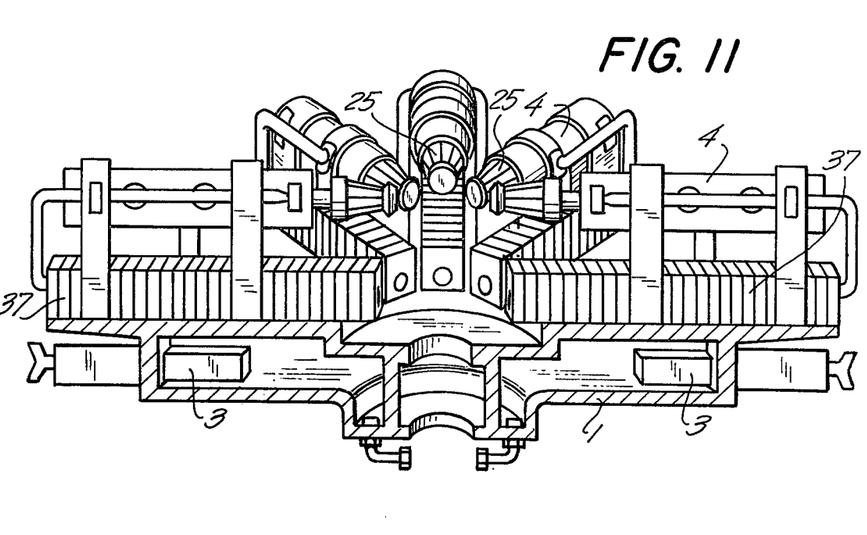
FIG. 11 is a prospective partly sectional explanatory view of the vessel with expansion valves.

Referring to FIG. 1, there is shown a power wheel with double action valves of the present invention. The heat engine consists of a rotor FIG. 1 (1) in form a a hollow vessel divided into reservoirs which are filled with a working fluid (2). The fluid is activated by a heat source (3) which expands the fluid and therefore pressurizes the fluid to enter into expansion valves (4). The expansion valve consists of a circular or elliptical cylinder shown in FIGS. 3 and 4 (5). Inside the cylinder a piston (6) is moved strokewise in either direction. The movement is achieved by dividing the pressurized side of the fluid from the depressurized side of the fluid through piston (6) and inlet float valves (14) and outlet valves (13). The valves are controlled by pushrods (7) fixed to the piston (6) and penetrating cylinder block (38). The stroke action of the piston will move piston rods (7) in or out of cylinder block (38). On the very end of each pushrod, a lever (17) connects pushrod with valve control bar (8). The control bar has two stoppers (15 and 16) installed to activate valve lever (11) in order to put the valve in an on or off position. The timing can be adjusted by putting valve lever FIG. 5 (11) in an on or off position indicated by the valve opening FIG. 5 (10) which penetrates through valve piston (9). FIG. 3 shows piston (6) changing direction from the right to the left indicated by the arrow on inlet valve (14) and outlet valve (13). When the piston moves from right to left pawl bushing (19) will engage into ratchet gear (21) from piston (6) shown in FIG. 3. Pistons changing the opposite direction is shown in FIG. 4. When the stopper unit (15) moves valve level (11) of valve units (13 and 14) into an opposite direction this will move piston to the right by engaging pawl bushing (20) with ratchet gear (21) and at the same time disengage pawl bushing (19) from ratchet gear (21) since the spindle shaft has a right and left grooved spindle matched with a right and left grooved pawl bushing as shown in FIGS. 8–10. A continuous rotation of the spindle shaft (36) in one direction is accomplished through stroke action of piston (6) and pawl busing (19) and (20) by engaging sequently one at a time into ratchet gear (21) of piston (6). FIG. 7 shows piston (6) and cylinder (5) in cross section. Number (21) shows the ratchet gear. The piston (6) consisting of two different diameters, the large diameter is exposed to the working fluid as the small diameter prevents the fluid from penetrating into the space of the helical mechanism. Number (28) shows screws to fasten anchor plate (24) FIG. 8. Pushrod (7) are needed for valve functioning and preventing piston from turning. The best security to prevent piston from turning is an elliptical shaped piston and cylinder. The pawl bushings are split in half as shown in FIG. 10 in order to install the pawl bushing. The two part of the bushing are kept together through lock springs FIG. 10 (23) and lock groove (22). When the pawl bushings are inserted into piston (6) anchor plate (24) will keep pawl bushing and spring (35) inside the piston FIG. 9. FIG. 11 shows the vessel (1) with heat source (3), radiator (37), expansion valves (4) and pinion gears (25). Both shafts and side gears are removed for better vision. The expansion valves are removable which allows to adjust the machine for different horsepower output. The machine can operate in any position depending on the purpose the machine will be used for. As example in FIG. 12 the machine is put in upside down position for drilling action.

POWERWHEEL IN CONJUNCTION WITH A DRILL BIT

Figures 12, 13, 14:
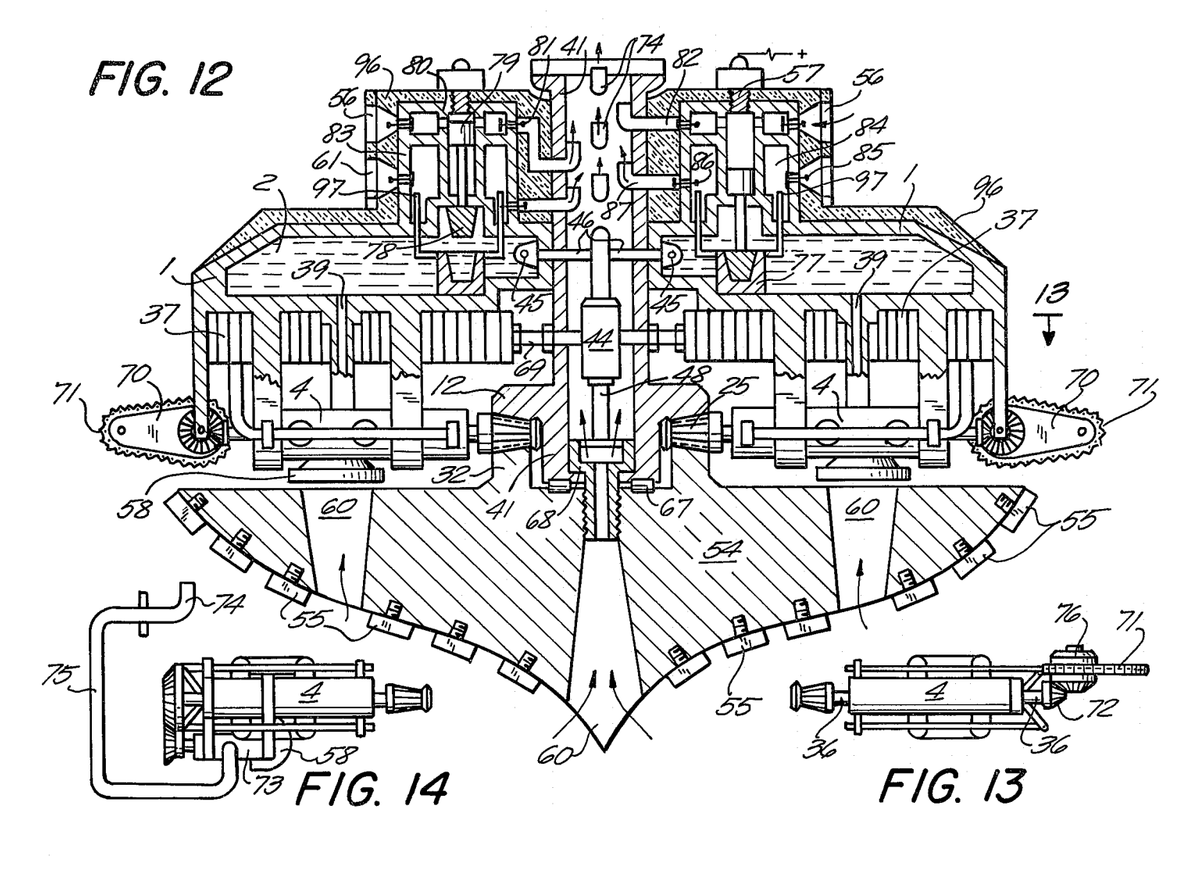
FIG. 12 is a partly sectional explanatory view of a power wheel with double action valves in conjunction with a drill bit.
FIG. 13 is a plain view of a heat expansion valve in conjunction with a chain saw.
FIG. 14 is a plain view of a heat expansion valve in conjunction with a suction pump.

FIGS. 12 to 16 shows a powerwheel in conjunction with a drill bit. The difference between the above described powerwheel and the herein described powerwheel is the position of the machine. FIG. 12 shows a sectional explanatory view of the powerwheel mounted at the top of a drill bit. The powerwheel is in a upside-down position, meaning expansion valves (4) are at the bottom of the machine and the fluid reservoir (2) is at the top of the machine. Drill bit (54) is joined to the powerwheel by a thrust bearing (67) and inserted shaft (41) from powerwheel. Both units are kept together through hollow bolt (68). Meaning the connection between the powerwheel and the drill bit is made by putting the power wheel on top of drill bit (54) whereby the side gear (32) from drill bit is intermeshing with pinion gears (25) which is also intermeshing with side gear (12) from the powerwheel shaft (41). When the drill unit is lowered onto the ground, the powerwheel has to be prevented from turning till drill bit (54) with the help of cutting edges (55) has lowered itself into the ground deep enough to make contact with chain saw (70–71). The saw blades cutting into the ground will prevent powerwheel from rotating. Therefore, most of the torque provided inside the expansion valves (4) is transmitted to pinion gears (25) which are intermeshing with both side gears to rotate side gear (32) which is locked in fixed position against drill bit (54). During operation as the unit lowers itself into the ground whereby pulverized sediments produced during drill action are channeled through channel (60) which penetrates drill bit (54) to be sucked up by suction grill (58) which directs the pulberized sediments as shown in FIG. 14 through suction pump (73) whereby the contents becomes accelerated through a pressure pipe (75) to be injected through jet (74) into a upper direction inside the hollow drive shaft of the powerwheel FIG. 12 (41-74). The rotation of the chain saw is also introduced through the expansion valves as shown in FIG. 13. Meaning the spindle shaft (36) is extended and inserted into a side gear (72) to rotate sprocket (76) of chain saw (71). The heat source to expand the fluid can be a conventional or nuclear device. However, for deep sea drilling a nuclear heat source is most demanding. There are two major nuclear heat sources suitable for this machine. The weaker heat sources are radio isotopic heat elements which are obtained from nuclear waste in form of a heat radiated metals. Fission reaction is a more powerful nuclear heat conversion needed in deep sea operation, not only because of the large amount of thermo heat released, but also because a large amount of electrons released by each nuclear compulsion whereby the electrons are collected by electrodes separate the sea water into its basic elements of oxygen and hydrogen, thereby, creating gas bubbles inside the flexible hose which will elevate the contents inside the hose to the surface.

POWERWHEEL WITH A SELF-OSCILLATING NUCLEAR REACTOR

FIG. 12 shows a cross section through two nuclear reactors and the fluid reservoir of the powerwheel. The nuclear reactor consists of a fixed distinct nuclear mass block and a freely mobile distinct nuclear mass block, by which the mobile mass is fixed by a shaft to a piston which moves freely inside a cylinder. The mobile nuclear mass is joined perfectly into the fixed stationary nuclear mass by means of a tapered cylinder inside the stationary nuclear mass and a tapered piston of the mobile nuclear mass. When both nuclear masses make contact with each other they become super critical. Hereby the resulting nuclear reaction or excursion takes the form of a very high pulse of energy with a high rate of thermo expansion between the surfaces such that the surface and the expansion of the moderator thereof effectively act as a spring and force the mobile nuclear block with great force upwards which moves piston (79) upward in cylinder (80) whereby sea water stored inside the cylinder is pushed through one way valve (81) into the hollow shaft of the powerwheel in an upward direction. Gravitational force begins to move the piston (79) and mobile nuclear mass block (78) back into stationary nuclear mass block (77) as shown in FIG. 12. Again this will introduce a nuclear compulstion whereby the mobile nuclear mass block and piston is moved by great force towards which by each impulse pumps sea water through opening (56) to accelerate it through jet pipe (82). In order to accomplish this kind of sea water jet propulsion one way valves (81) have to be installed to operate sequantly by the movements of piston (79). The cylinder (80) which guides piston (79) is consealed inside a cylinder, which has an opening (61) to the sea water side, so the space (84) inside water cylinder (83) is also filled with sea water. During each nuclear compulsion or pulse a appreciable amount of electro magnetic energy is released through electrodes (97) powerful enough to split the salt water molecule into its elementary substance meaning separating hydrogen and oxygen from the water called electrolysis. When sufficient gases are stored in pressure tank (84) the gases will explode, thereby closes one way valve (85) at the same time open one way valve (86) to release the pressurized gases through a jet opening (87) into an upward direction through the hollow drive shaft (41). These statements are made to describe the water cycle of the machine which is needed as a buffer zone to slow down the oscillating nuclear impulses. All reactors can be shut off at once by activating electromagnet (57) which automatically will keep piston (79) and so mobile nuclear mass block (78) in an upper position and thereby neutralize all nuclear raaction. This also allows a precise timing regulating the pulse of the nuclear reaction by the frequency of the electro magnet, meaning the time ratio between the on and off positions. Energy charged particles such as Gamma Rays released during nuclear compulsion are reflected back into the reactor through a insulating coating (96) covering the reactor and the fluid vessel. The coating consists of a heavy layer made from mineral or metal crystal ships bonded in clay or ceramics. Nuclear energy charged particles will be deflected each time they penetrate a crystal and therefore cannot escape to the outside especially when the reactor walls are made from depleted uranium 238.

THE CYCLE OF THE WORKING FLUID OF A CONVENTIONAL POWERWHEEL

The vessel FIG. 1(1) conseals the fluid inside reservoir (2). By applying heat like solar rays, microwave, or radio isotopic heat elements (3), this will expand and so pressurized the fluid through pressure pipe (39) into expansion valve (4) which will move piston FIG. 3(6) in one direction till valve control bar FIG. 3(8) changes sequently valve positions as shown in FIG. 4 whereby the fluid runs out of the expansion valve FIG. 1(4) into the outlet pipes (40) to be directed into radiator (37) for cooling purposes. A fluid circulating pump FIG. 1(44) installed inside the rotor shaft (41) will suck up the fluid from the radiator through a fluid channel (42) and one way valve (61) to pump the relaxed fluid through feeding pipes (46) and one way valve (45) into reservoir (2). In order to secure breathing action inside the fluid return channel (42) an air cushion (43) made from flexible material is installed. In this fashion the fluid is pressurized by heat expansion inside the vessel so the volume exchange of the fluid will move pistons strokewise inside the expansion valves regulated by float valves which separates the pressured side from the depressurized side of the fluid. The depressurized fluid is directed through a radiator (37) into a hollow shaft (42) from where the fluid is extracted through a pump (44) which pumps the fluid back into reservoir (2). This closes the liquid cycle of the fluid whereby the relaxed stage of the fluid can be of a far higher pressure degree than the surrounding environment, made possible by consealing hermetically the fluid from the outside. To increase the efficiency of the thermo dynamic cycle piston FIGS. 3 and 4(6) can be made of a heat radiating element like radio isotopic heat elements which are obtained from nuclear waste and therefore are available in abundance. The leading candidates in isotopic power are plutonium, cobolt, cerium, stroniu, (SR-90), requires 28 years to reach half of the output power which variates in the heat range of 900 Fahrenheit degree. The output of the radio isotopic heat source does not require operator controls since it is inherently self regulating and will release energy steadily and effectively over the lifetime of the fuel. This means the powerwheel with double action valves and radio isotopic heat elements can operate without external fuel supply over a life span of a human being. Actually radio isotopic heat elements in low heat range can last as long as a million years; therefore, the heat source does not limit the life span of the machine but the wear out among engine parts and the possible breakdown of the chemical property inside the fluid. In this regard, the powerwheel with double action valves activated through radio isotopic heat elements is a perpetual motion machine.

OPERATION OF THE POWERWHEEL WITH DOUBLE ACTION VALVES

FIG. 1 shows a powerwheel in sectional view to show how easy this machine can be installed and removed to any location. Additionally, also any part of the machine can be observed during operation and, therefore, the defected parts can be spotted immediately and repaired. The machine in FIG. 1 is placed in horizontal position. Shaft (41) of vessel (1) is joined to frame (26) by a thrust bearing (64). The upper end of the same shaft (41) is faced up with a side gear (12). The side gear intermeshes with pinion gears (25) and an opposite side gear (32). The opposite side gear is joined into the upper frame by a bushing (65) and kept in place through a flange (31). A brake disc with brake liners (30) lays on top of flange (31) to stop rotation of side gear (32) when pressure is applied on brake disc (30) through pressure plate (29). The relief from the spring pressure inside the pressureplate can be requlated by a lever (27) and solenoid (62) or any other hydraulic devices. Therefore, to rotate the vessel, flange (31) must be locked against frame (26) to stop rotation of upper side gear (32) which automatically will rotate lower side gear (12) and vessel (1). To convert the rotation of the vessel into useful power, a power gear (51) is fixed against shaft (41) of the vessel (1) and intermeshing with pinion gear (52) to drive power shaft (53) to do useful work. The speed of the rotation is controlled by a heat source (3) and brake lever (27) therefore no gear boxes or transmissions are necessary. Pumpshaft (48) is rotated through a drive gear (49) driven by a fixed gear (50) locked against the frame (26). To stop the machine lever (27) has to be pulled down to release spring pressure inside pressure plate (29) which will release pressure at the top of flange (31) to free the shaft (66) of side gear (32) with the result that upper side gear (32) starts to rotate as lower side gear (12) stops to rotate because of the greater resistance introduced by the weight of the vessel, meaning the machine can be engaged or disengaged just by activating lever (27). To remove this machine one has to take off only the upper side gear (32) which gives enough play to lift the vessel out from thrust bearing (64) to move the vessel out from the frame (26), meaning only one part has to be removed to install or remove the machine in a matter of a few minutes to any location. A dream for mechanics and those enjoying proper engineering.

THE CYCLE OF THE WORKING FLUID OF A NUCLEAR POWER WHEEL IN CONJUNCTION WITH A DRILL BIT

The vessel FIG. 12(1) is filled with an expansible fluid like liquid helium (2). Nuclear stationary mass block (77) and mobile nuclear mass block (78) are consealed inside the fluid reservoir whereby the thermo heat expansion of the nuclear mass blocks heating up the fluid inside the reservoir and thereby forces the fluid under great pressure through pressure pipe (39) into expantion valve (4), whereby the expansion of the fluid moves a piston between the pressurized side of the fluid against the depressurized side of the fluid which in return rotates pinion gear (25) to rotate drill bit (54). A pressure pump (44) installed in center of hollow shaft (41) which is locked to the powerwheel. Therefore, the pump shaft (48) is locked in center of drill bit (54) through a lock screw (68). Therefore, the rotation of the drill bit is converted into pump action by pump shaft (48) and gear pump (44). The pump will extract the relaxed fluid out from the radiator (37) through suction hose (69) and pump it back into fluid reservoir (2) through pressure feeding pipes (46) and one way valves (45). This closes the liquid cycle whereby a fluid is pressurized inside a fluid reservoir and forced through expansion valves which separate the pressurized fluid from the depressurized fluid by pistons and mechanical float valves so that depressurized fluid can circulate through radiator into relaxed stage from here the fluid gets sucked up and pumped back into the fluid reservoir.

OPERATION OF THE POWERWHEEL IN CONJUNCTION WITH A DRILL BIT FOR DEEP SEA MINING

Figures 15, 16:
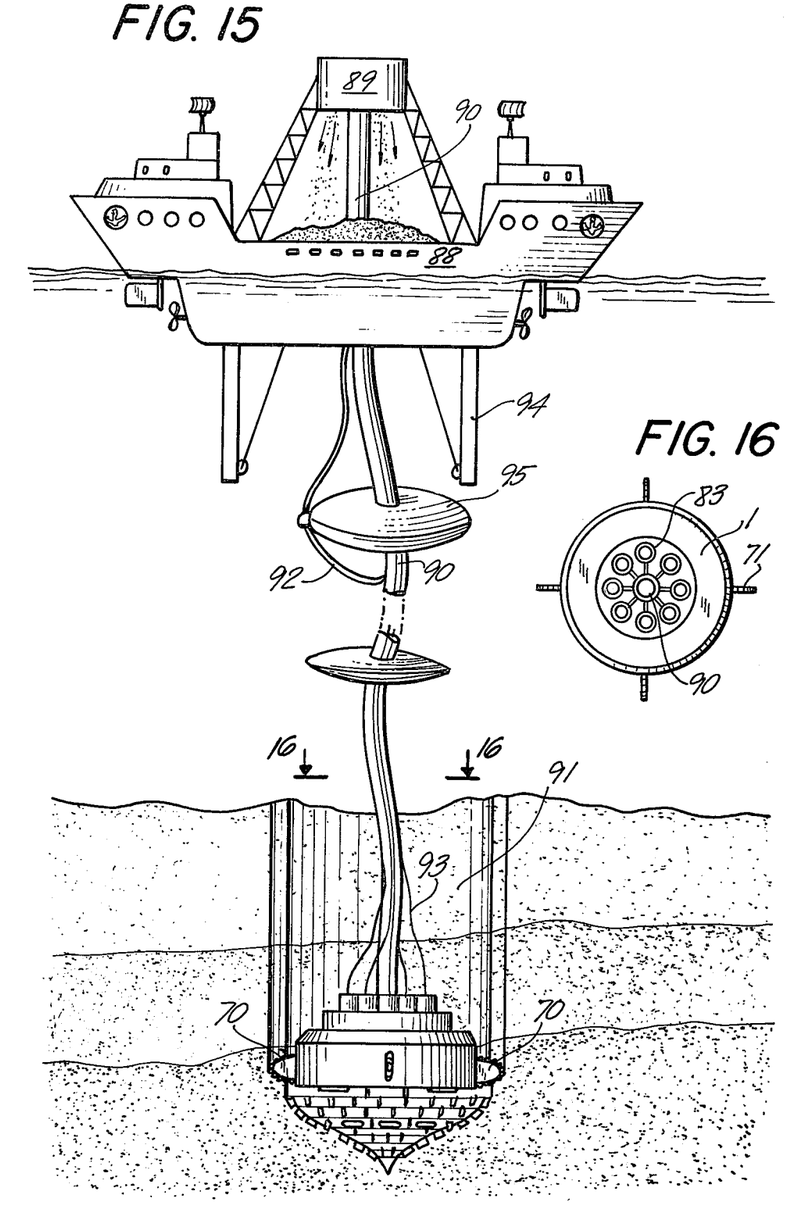
FIG. 15 is a schematic explanatory plain view of a power wheel in conjunction with a drill bit operating on the oceanic floor.
FIG. 16 is a plain top view of a power wheel with a drill action.

FIG. 15 shows a vessel with a duplex propel and steering system in order to keep the position on top of a powerwheel operating on the oceanic floor. The vessel (88) has a tower to unroll flexible tube (90) into the sea bed (91) in such a fashion that the contents of the hose is pumped up from the sea bed and collected and processed inside the vessel as the sea water is automatically released back into the sea. In order to accelerate the contents in the hose a compressor in the vessel will pressurize air which is injected through pressure air hose (92) in an upward direction into hose (90). Air pillows (95) are installed along the way of the flexible hose to reduce the weight of the hose and the contents consealed inside the hose (90). Wires (93) controlling the heat source are mounted around the flexible hose (90) and contacted to a control panel inside the vessel, the passage for the powerwheel through the vessel is achieved through an opening at the bottom of the vessel which can be closed by hydraulic shutters (94). FIG. 16 shows a top view of a powerwheel in conjunction with a drill bit. The drill bit itself cannot be seen from this position only the fluid reservoir (1) and reactor housing (83) and chain saw (71).

REMARKS

The present invention is introduced as a solo prime mover and as a prive mover in conjunction with a drill bit. To insure a smooth performance during operation the pinion gears FIG. 4 (25) are joined to the spindle shaft (36) by a ratchet gear (33) showing in detail in FIG. 6 (33). The ratchet gear (33) is locked into position by ratchet pins (34) which snap in into the grooves of ratchet gear (33) by tension of spring (35). An anchor plate (59) keeps the springs and pins against ratchet gear. The purpose of the pinion gears interlocking with ratchet gear from spindle shaft (36) is to allow the spindle shaft with the greater torque to take over the load of the machine to guarantee an evenly divided torque among the expansion valves (4) through pinion gears (25). This procedure is explained in a previous U.S. Pat. No. 4,340,970. Meaning the present invention is an improvement of the previous invention whereby the power output is increased to ninety five percent (95%). This allows the present invention to introduce a new approach in soft ground drilling as used to drill water holes or to collect minerals from the ocean floor called Oceanic Mining. There is quite a difference between land mining and oceanic mining. Land mining consists of rock formation, oceanic mining consists of a pulverized dust consisting of non corroding metals mixed with organic matter which has settled since the creation of earth into the deepest valleys in the oceans covered by mud. Therefore, when these precious metal layers of dust are tap by the drill bit of this invention, gold and platimum dust can be sucked up from the ocean floor for generations to come. The uplift of the metal dust inside the hose is achieved by gas bubbles released inside the hollow shaft of the powerwheel. The gas bubbles are produced by electrolysis indicated in FIG. 12. By electrode (97) installed inside sea water pressure chamber (84). The gases are released through one way pressure valve (86) and injected by injector (87) into the flexible hose (90). The uprising hydrogen and oxygen bubbles creating an upward currency strong enough to elevate the mineral dust from any depth to the surface. Drilling operations not deeper than five thousand feet from the sea level can be conducted by a conventional heat source. Nuclear heat source become necessary below five thousand feet more so because of the greater amount of gas bubbles produced by nuclear fission as shown in FIG. 12. When mobile nuclear mass block (78) hits stationary nuclear mass block (77) an appreciable amount of electrons are released and collected by electrons (97) to separate sea water into its basic elements of oxygen and hydrogen. The uprising current inside the hose can be increased by air jets which pressurized air is supplied by a compressor above the water surface to inject air in one or more points along the flexible hose under water as shown in FIG. 12(92). The principal of this idea is already claimed in a previous U.S. Pat. No. 4,340,970. While there have been shown and described and pointed out the fundamental features of the invention as applied to a preferred embodiment, it will be understood that various omissions and substitutions and changes in the form and detail of the device illustrated and in its detail may be made by those skilled in the art without departing from spirit of the invention. It is the intention, therefore, to be limited only as indicated by the scope of the following claims.

I claim:

1. A power wheel with double action valves comprising a vertical axis mounted on a frame means shaft having first and second ends, said both ends fixed to a side gear whereby both gears confronting each other and connecting each other by a plurality of pinion gears intermeshing with both side gears,
   a wheel fixedly mounted between the first and second end of said shaft, said wheel having an outer perimeter,
   a plurality of expansion valves mounted on said outer perimeter on radial axis,
   each of said expansion valves including a hollow T shaped piston,
   a pressurized fluid, a pair of push rods connecting:
   A. a pair of valve control bars,
   B. a pair of duplex inlet and outlet valves,
   C. a pinion gear intermeshing with said stationary side gear and a satellite gear,
   D. a drive gear for delivering useful work output wherein a plurality of expansion valves are activated,
   E. said pressurized fluid supplied from
   F. a fluid vessel through valve controls separating high pressurized fluid from low pressurized fluid whereby relaxed fluid is channeled through
   G. a radiator via a hollow shaft,
   H. said Shaft containing an interior pressure pump extracting relaxed fluid out of said radiator to be pumped back into a pressure cell,
   I. said Pressure cell including
   J. a plurality of heating elements, heat elements selected to be conventional or nuclear and said satellite gear mounted in center of a drill bit,
   K. said drill bit consisting of a solid tapered disc with a plurality of exchangeable cutting edges.

2. Power wheel of claim 1 wherein a hollow T shaped piston conceals a pawl bushing mechanism to convert reciprocatory motion of piston into rotation if spindle shaft.

3. The power wheel of claim 2 wherein a pawl bushing mechanism consists of two individual pawl bushing with opposite tracks riding on a helically groove along side a shaft said pawl busing intermeshing with active piston by a stern ratchet gear one at a time depending on movement of piston to rotate a spindle shaft in one direction.

4. The power wheel of claim 3 in which the shaft of the vessel is hollow to circulate working fluid through the shaft by means of a pump which is installed inside the shaft and activated through a gear installed outside the shaft against the frame.

5. The power wheel of claim 4 in which a drill bit is mounted on top of satellite gear facing the bottom of the machine to be put on the sea floor in order to drill into the sea floor assisted by its own weight.

6. The power wheel of claim 5 further includes chain blades extending outward from the circumference of the machine to cut into the ground in order to prevent prime mover from rotating.

7. The power wheel of claim 6 wherein heat element includes a reciprocating nuclear reactor consisting of two distinct nuclear mass blocks made from Uranium 235 whereby one mass block is in a fixed position as second masss block matching into opening of stationary mass block whereby surface contact introduces a nuclear reaction in form of a high rate of thermal expansion whereby second mass block is moved in latitude movement connected to a piston inside a cylinder to accelerate sea water by stroke action of piston.

8. The power wheel of claim 1 further includes electrode extending from the stationary nuclear mass blocks and penetrating through the shielded vessel of the working fluid into sea water pressure chamber to separate the sea water into its basic elements of oxygen and hydrogen needed to elevate the contents of the flexible hose.

9. The power wheel of claim 8 further includes a control device for oscillating nuclear reaction whereby a electro magnet is placed on top of the cylinder which conceals a piston connected to mobile nuclear mass block in such a fashion that by maximum stroke action upper surface of a piston matches contact surface magnet therefore piston can be kept through electro magnetism in a fixed position or released whereby gravitational force will lower piston with mobile nuclear mass block into stationary mass block.

10. Power wheel of claim 9 further includes a flexible hose mounted on top of hollow shaft collects drill chips and sea water to accelerate the substance into a three stage acceleration,
    A. first stage introduced by electrolysis through the nuclear reaction of a pair of critical nuclear mass blocks,
    B. second stage introduced by reciprocatory motion of a nuclear mass block via sea water pump action,
    C. third stage introduced by air injection supplied from above sea level.

11. Power wheel of claim 10 further includes a mining vessel equiped with a front and rear steering and propulsion system able to maneuver the vessel around its own axis and raise or lower the apparatus of the invention.

12. Power wheel of claim 11 further includes a flexible hose connecting drill unit on the ocean floor with a vessel above it whereby vessel supplies high pressurized air through a high pressurized hose penetrating the flexible hose to inject air into the contents of the hose to increse the upper flow of the contents.

13. Power wheel of claim 12 further includes air pillows installed around the flexible hose to balance the weight of the hose.

* * * * *